United States Patent
Anand et al.

(10) Patent No.: US 9,009,165 B2
(45) Date of Patent: Apr. 14, 2015

(54) HIGH PERFORMANCE HASH-BASED LOOKUP FOR PACKET PROCESSING IN A COMMUNICATION NETWORK

(71) Applicant: Telefonaktiebolaget L M Ericsson (publ), Stockholm (SE)

(72) Inventors: Prashant Anand, Bangalore (IN); Ashish Anand, Bangalore (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 129 days.

(21) Appl. No.: 13/738,316

(22) Filed: Jan. 10, 2013

(65) Prior Publication Data

US 2014/0195545 A1    Jul. 10, 2014

(51) Int. Cl.
  *G06F 17/30* (2006.01)
  *H04L 12/743* (2013.01)
  *H04L 12/851* (2013.01)

(52) U.S. Cl.
  CPC ...... *G06F 17/30949* (2013.01); *H04L 45/7453* (2013.01); *H04L 47/2441* (2013.01)

(58) Field of Classification Search
  CPC .................. G06F 17/30949; G06F 17/30067
  USPC ........................................................ 707/747
  See application file for complete search history.

(56) References Cited

U.S. PATENT DOCUMENTS

| | | | |
|---|---|---|---|
| 6,067,547 A * | 5/2000 | Douceur | 1/1 |
| 6,567,817 B1 * | 5/2003 | VanLeer | 1/1 |
| 7,103,794 B2 * | 9/2006 | Malcolm et al. | 714/4.1 |
| 8,212,695 B2 * | 7/2012 | Artan et al. | 341/106 |
| 8,271,564 B2 * | 9/2012 | Dade | 707/698 |
| 8,370,936 B2 * | 2/2013 | Zuk et al. | 726/23 |
| 2003/0210689 A1 | 11/2003 | Davis et al. | |
| 2011/0225168 A1 | 9/2011 | Burroughs et al. | |

\* cited by examiner

*Primary Examiner* — Rehana Perveen
*Assistant Examiner* — Hicham Skhoun (57) ABSTRACT

The present invention relates to methods and apparatus for performing a lookup on a hash table stored in external memory. An index table stored in local memory is used to perform an enhanced lookup on the hash table stored in external memory. The index table stores signature patterns that are derived from the hash keys stored in the hash entries. Using the stored signature patterns, the packet processing node predicts which hash key is likely to store the desired data. The prediction may yield a false positive, but will never yield a false negative. Thus, the hash table is accessed only once during a data lookup.

18 Claims, 9 Drawing Sheets

HIGH PERFORMANCE HASH-BASED LOOKUP FOR PACKET PROCESSING IN A COMMUNICATION NETWORK

TECHNICAL FIELD

The present invention relates generally to flow-based packet processing in a packet-switched network and, more particularly, to hash-based lookup tables for determining rules applied by a packet processing node to different packet flows.

BACKGROUND

In software defined networks, and in policy-based fourth generation (4G) wireless communication networks, there is an increasing demand for flow-based packet processing, flow-based policy enforcement, and flow level isolation. In such networks, different roles may be applied to different packet flows. When a packet arrives at a packet processing node, the packet processing node needs to determine the appropriate rule set to apply to the packet flow. It is known to use a hash table to look up the rules to apply to a given packet flow. In general, each packet flow is associated with a unique flow identifier. The flow identifier is hashed by a hashing function to generate a hash key. The hash key is associated with one or more rules and is stored in a hash table. When a packet arrives at the packet processing node, the packet processing node extracts the flow identifier from the packet, hashes the flow identifier to obtain a search key, and uses the search key to look up the rules to apply to the packet flow.

Typically, the hash table is stored in an external memory, such as a DDR3 SDRAM. The hash-based lookup function compares the search key with each entry in the hash table until a match is found. This process may require many memory accesses, and each memory access adds to the processing delay. In a high speed packet processing node, it is generally desirable to reduce these delays as much as possible.

Various techniques are known to speed up the lookup operation on a hash table. For example, the hash table may be divided into a plurality of buckets. Each bucket comprises a plurality of hash entries forming a hash chain. Flow identifiers are assigned to buckets in a deterministic manner. Therefore, the packet processing node needs to search a single bucket to find a matching hash entry. In this case, the number of memory accesses is dependent on the link of the hash chains in each hash bucket.

Even when hash buckets are used, the packet processing node may need to access the memory multiple times to perform a lookup. Therefore, new techniques that reduce or minimize the number of memory accesses required to perform a data lookup are needed.

SUMMARY

The present invention relates to methods and apparatus for performing a lookup on a hash table stored in external memory. The hash table is divided into a plurality of buckets. Each bucket comprises a plurality of hash entries. Each hash entry contains a hash key and associated data. An index table stored in local memory is used to perform an enhanced lookup on the hash table. The index table stores signature patterns that are derived from the hash keys stored in the hash entries. Using the stored signature patterns, the packet processing node predicts which hash key is likely to store the desired data. The prediction may yield a false positive, but will never yield a false negative. As a result, the hash table is accessed only once during a data lookup.

Exemplary embodiments of the invention comprise a method, implemented by a packet processing node in a packet-switched network, for performing a data lookup on a hash table. One exemplary method comprises a packet containing a flow identifier is received and a full search key is generated from the flow identifier. A corresponding hash bucket in the hash table is determined based on the full search key. The bit locations of signature bits in the full search key are determined. A compressed search key is created from the signature bits in the full search key. A hash entry index for a target hash entry in the hash bucket is predicted by comparing the compressed search key to signature patterns that are mapped one-to-one to hash entries in the hash bucket. The target hash entry comprises a hash key and associated data. A data lookup is performed by comparing the full search key to the hash key in the target hash entry.

Other embodiments of the invention comprise a packet processing node configured to perform a data lookup on a hash table. In one exemplary embodiment, the packet processing node comprises an interface circuit for receiving a packet containing a flow identifier, and a control unit for processing the packet. The control unit is configured to generate a full search key from the flow identifier and to determine a corresponding hash bucket in a hash table based on the full search key. The control determines bit locations, for the corresponding hash bucket, of signature bits in the full search key and creates a compressed search key from the signature bits in the full search key. The control unit predicts a hash entry index for a target hash entry in the hash bucket by comparing the compressed search key to signature patterns that are mapped one-to-one to hash entries in the hash bucket. The target hash entry comprises a hash key and associated data. The control unit then performs a data lookup on the hash table by comparing the full search key to the hash key in the target hash entry.

Embodiments of the present invention allow faster hash lookups to be performed by reducing the number of times the external memory needs to be accessed to perform the lookup. The index table used for performing enhanced hash lookup as herein described can be stored in internal registers, L1 cash, or L2 cash, which can be accessed in fewer processing cycles than the external memory. Even with additional processing instructions, the enhanced lookup can be performed in significantly less times than a conventional lookup.

DETAILED DESCRIPTION

Figure 1:
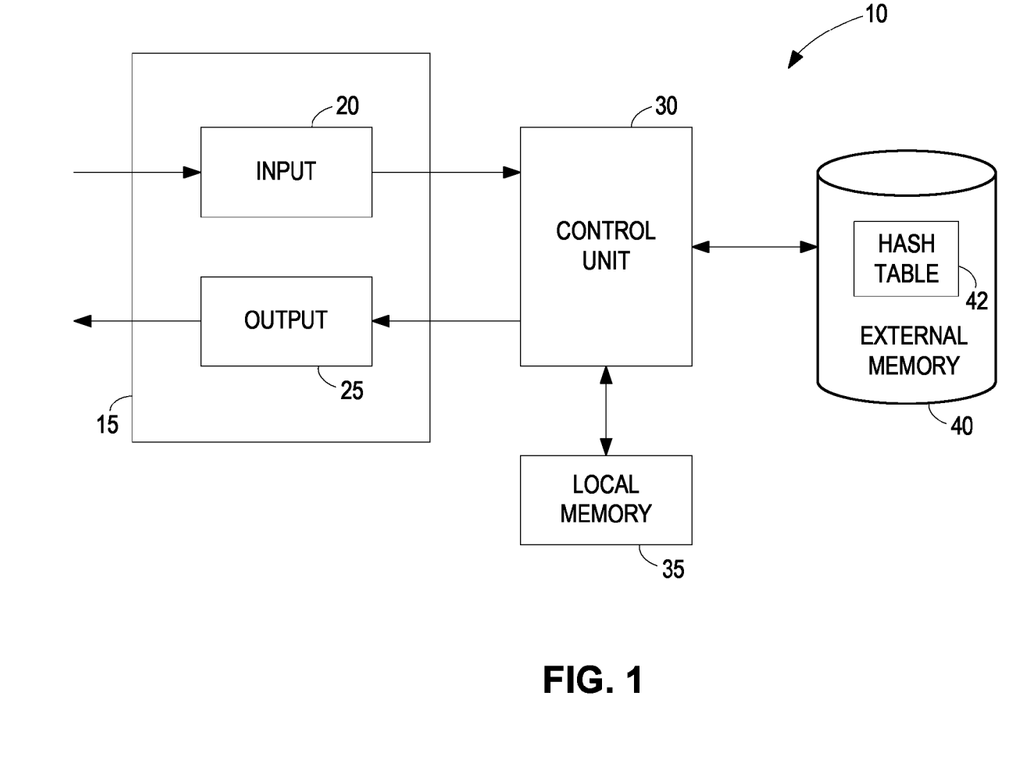
FIG. 1 illustrates an exemplary packet processing node according to an exemplary embodiment.

Referring now to the drawings, FIG. 1 illustrates the main functional elements in a packet processing node 10 according to one exemplary embodiment. The packet processing node comprises an interface circuit 15 including an input circuit 20 and output circuit 25, a control unit 30, a local memory 35, and an external memory 40. The interface circuit 15 connects the packet processing node 10 to a communication network. The interface circuit 15 may comprise, for example, an Ethernet interface or other IP-based interface. The control unit 30 controls the operation of the packet processing node 10 as hereinafter described. The control unit 30 may comprise one or more processors, microcontrollers, hardware circuits, firmware, or a combination thereof. The local memory 35 may comprise register files, L1 cache, L2 cache or another memory array in a microprocessor. The local memory 35 is used to store an index table 48 (FIG. 2) for performing hash-based lookups as hereinafter described. In one exemplary embodiment, the control unit 30 and local memory are embodied in a single microprocessor. The external memory 40 may comprise a random access memory (RAM), read-only memory (ROM), Flash memory, or other type of memory that is external to the control unit 30. The external memory 40 is used to store a hash table 42 (FIG. 2) that contains the rules or other data for processing different packet flows. The external memory may, for example, comprise a synchronous dynamic RAM (SDRAM), such as a DDR3 SDRAM.

Figure 2:
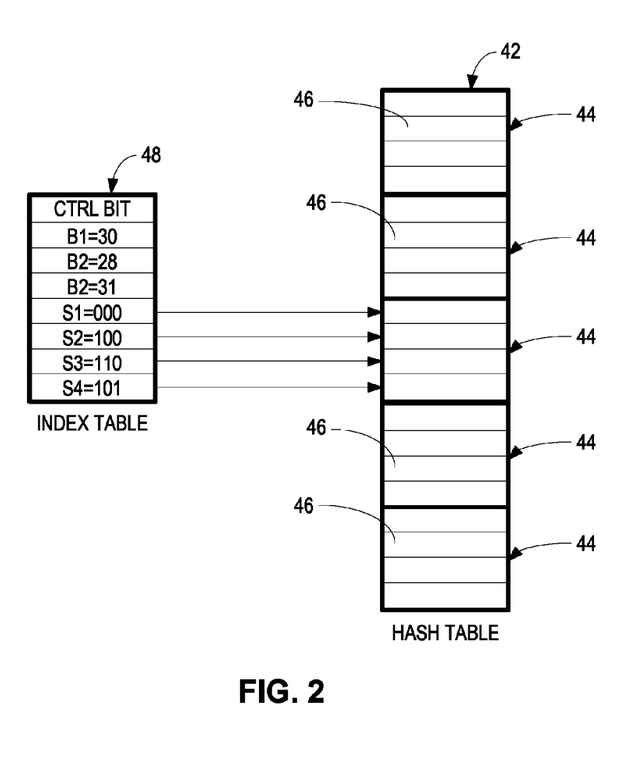
FIG. 2 illustrates data structures for performing a lookup on a hash table according to an exemplary embodiment.

FIG. 2 illustrates the data structures used to perform the hash-based lookup in one exemplary embodiment. The data structures include a hash table 42 that is stored in external memory 40 and an index table 48 that is preferably stored in local memory 35. The hash table 42 is divided into a plurality of hash buckets 44. Each hash bucket 44 contains a plurality of hash entries 46 that are logically connected to form a hash chain. Each hash entry 46 contains a hash key and associated data.

Each hash key stored in the hash table 42 is derived by hashing the flow identifier for a packet flow with a hash function. The hash key for a given packet flow is given by:

$$\text{HASH\_KEY}=\text{HASH}(\text{FLOW\_ID}) \quad \text{Eq. (1)}$$

where FLOW_ID is the flow identifier for the packet flow. The associated data is used by the packet processing node 10 to process data packets belonging to the corresponding packet flow. Ideally, the associated data is distributed evenly across the hash buckets 44. Given the hash key and number of buckets (i.e., bucket array size), a bucket index may be computed as follows:

$$\text{INDEX}=\text{HASH\_KEY}\%\text{ARRAY\_SIZE} \quad \text{Eq. (2)}$$

where % denoted the modulo function and ARRAY_SIZE denotes the number of buckets. Eq (2) functions as a mapping algorithm to map the hash key to a particular bucket. The index computed according to Eq. 2 identifies the hash bucket 44 where associated data for a given packet flow, if it exists, is stored.

When a packet flow arrives at the packet processing node 10, the packet processing node 10 computes a full search key according to Eq. (1) and computes a bucket index according to Eq. (2). The bucket index indicates the hash bucket 44 where desired data, if it exists, is stored. In conventional packet processing, the packet processing node 10 performs a data lookup by searching for a matching hash entry 46 in the identified hash bucket 44 identified beginning with the first hash entry 46 and continuing until a match is found. The packet processing node 10 traverses the hash chain 48 in the identified hash bucket 44 and compares the computed hash key with the stored hash key in each hash entry 46 until a match is found. Each compare operation requires that the packet processing node 10 retrieve the hash entry 46 from external memory. The average number of memory accesses to perform a data lookup is proportional to the length of the hash chain. Each comparison operation increases the costs of a data lookup in terms of time and processing resources.

In exemplary embodiments of the present invention, the index table 48 is used to perform an enhanced data lookup. The index table 48 may, in some embodiments, be stored in local memory 35, which can be accessed in fewer processing cycles as compared to external memory 40. The index table 48 stores signature patterns that are derived from the hash keys stored in the hash entries 46. As will be described in greater detail below, certain bits designated as signature bits in each hash key are used to compute the signature pattern for the hash entry 46. Using the stored signature patterns, the packet processing node 10 predicts which hash key 46 is likely to store the desired data. The prediction may yield a false positive, but will never yield a false negative. Based on the prediction, the packet processing node 10 retrieves the predicted hash entry 46 from external memory and compares the full search key computed according to Eq. (1) to the hash key in the predicted hash entry 46. If the search key matches the stored hash key, the search is successful. If the search key does not match the stored hash key, then the desired data is not stored in the hash table 42. In embodiments of the present invention, the hash table 42 is accessed only once during a data lookup. As a result, the index table 48 significantly reduces the time and processing resources required to perform a fast data lookup.

FIG. 2 illustrates the structure of the index table 48 in one embodiment. In the exemplary embodiment shown in FIG. 2, the index table 48 stores, for each hash bucket 44, a control bit, a plurality of bit indices, and a plurality of signature patterns corresponding to the hash entries 46 in the hash bucket 44. The control bit indicates whether enhanced lookup is enabled. The bit indices indicate the bit locations of signature bits used to compute signature patterns. The signature patterns are used for comparison with a compressed search key to predict the hash entry 46 where desired data is stored.

Figure 3:
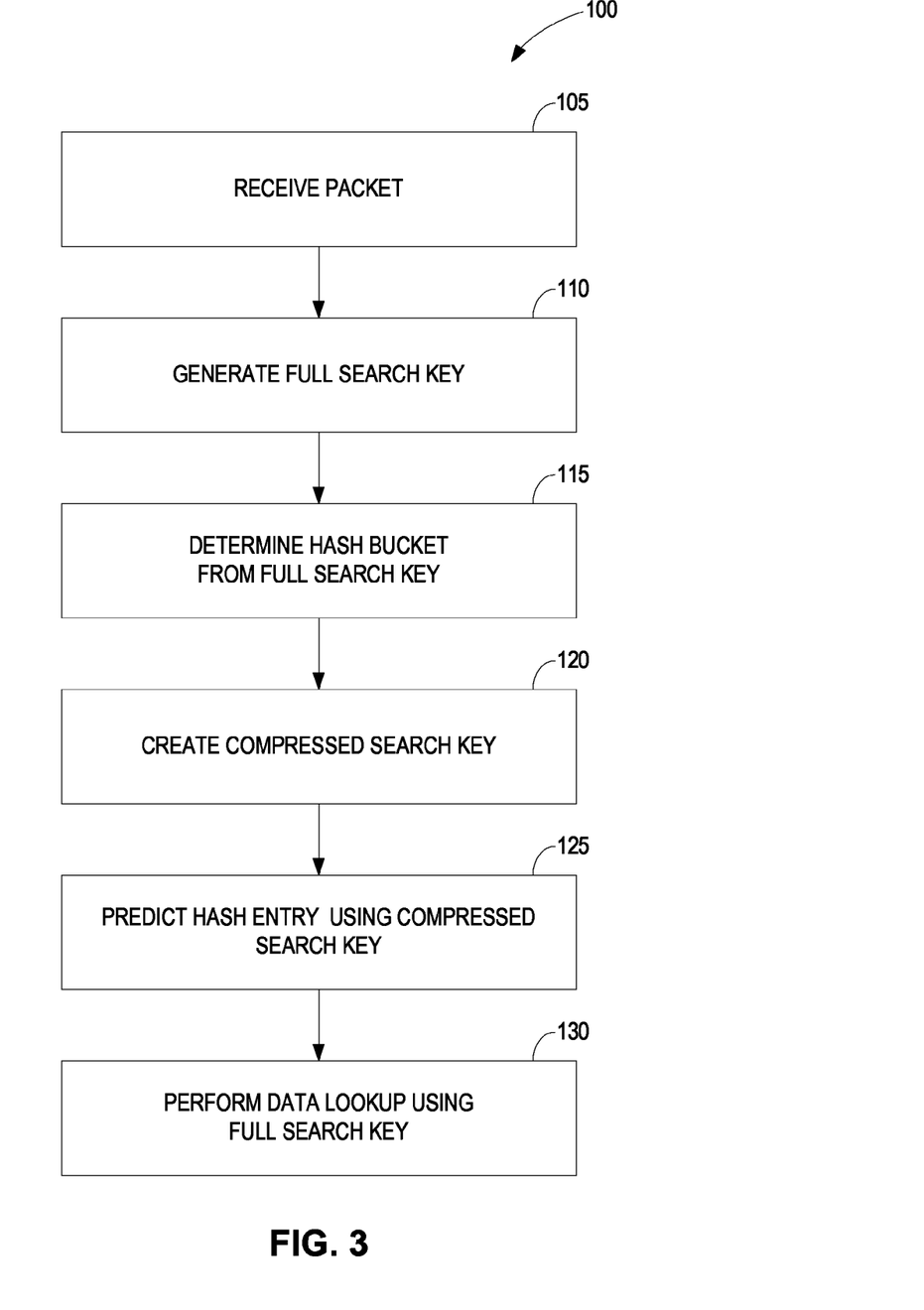
FIG. 3 illustrates an exemplary method of performing a lookup on a hash table according to an exemplary embodiment.

FIG. 3 illustrates a general method 100 implemented by the packet processing node 10 for performing a enhanced lookup according to an exemplary embodiment. The process begins when a packet is received by the packet processing node 10 (block 105). The packet processing node 10 extracts a flow identifier form the received packet and generates a full search key from the flow identifier (block 110). The full search key may be computed according to Eq. (1). The packet processing node 10 uses the full search key to determine a hash bucket 44 where the desired data, if it exists, is stored (block 115). The hash bucket 44 may be determined by computing a bucket index according to Eq (2). Eq (2) functions as a mapping algorithm to map the full search key to a particular bucket. The packet processing node 10 then creates a compressed search key (block 120). In one exemplary embodiment, the compressed search key comprises selected bits in the full search key. The packet processing node 10 uses the compressed search key to predict the hash entry 46 containing the desired data (block 125). The prediction may yield a false positive, but will never yield a false negative. The packet processing node 10 then performs a data lookup by comparing the full search key to the hash key stored in the predicted hash entry 46 (block 130).

Figure 4:
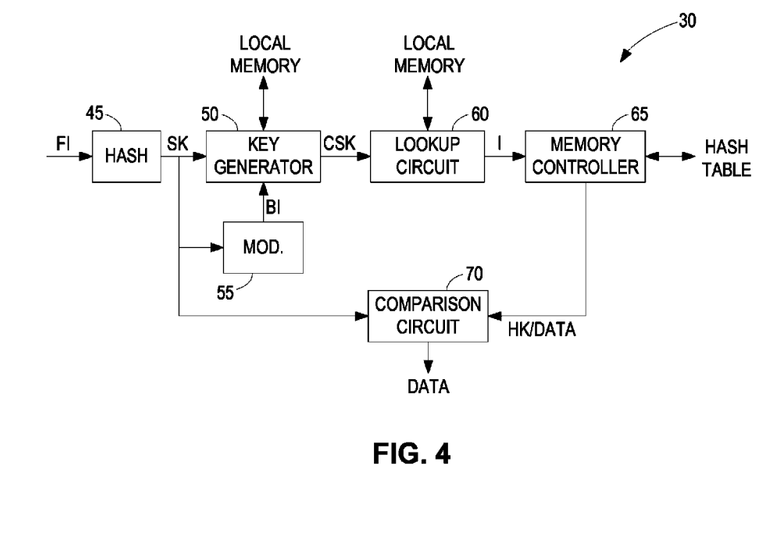
FIG. 4 illustrates the main processing components for performing a lookup on a hash table according to an exemplary embodiment.

FIG. 4 illustrates the main processing components of the control circuit 30 in one exemplary embodiment that are involved in performing lookups on the hash table 42. The main processing components include a hash calculator 45, key generator 50, index calculator 55, lookup circuit 60, memory controller 65, and comparison circuit 70. The processing components shown in FIG. 4 may be implemented by software, hardware, or a combination thereof.

When a packet arrives at the packet processing node 10, the flow identifier (FI) is extracted from the incoming packet and input to the hash calculator 45. The hash calculator 45 computes a full search key (SK) using a hash function, such as the MD5 and SHA hashing algorithms. The full search key (SK) is input to the key generator 50 and index calculator 55. The full search key (SK) may be computed, for example, according to Eq. (2). The index calculator 55 computes a bucket index (BI) based on the full search key (SK). The key generator 50 computes a compressed search key (CSK) from the full search key (SK). The bucket index (BI) provided by the index calculator 55 is used to lookup the bit indices for the signature bits, which are stored in the index table 48 in local memory 35. The signature bits are extracted from the full search key (SK) and combined to form the compressed search key (CSK). As an example, assume that the full search key (SK) is four bytes long and is given by:

00100000 00101000 00000000 00000000 and that the bit indices for the signature bits are {30, 28, 31}. In this example, the first signature bit indicates the most significant bit. The compressed search key (CSK) in this example is "100" (which corresponds to the 30th, 28th and 31st bits in the full search key above). The compressed search key (CSK) is provide to the lookup circuit 60. The lookup circuit 60 compares the compressed search key (CSK) to the signature bit patterns for the hash bucket 44 indicated by the bucket index (BI). If a match is found, the lookup circuit 60 outputs the hash entry index (I) that identifies an hash entry 46 in the hash bucket BI. The memory controller 65 accesses the external memory 40 to retrieve the hash entry 46 identified by the pair {BI, I}. The comparison circuit 70 compares the full search key to the hash key for the retrieved hash entry. If the full search key (SK) matches the hash key, the search is successful. Otherwise, the search fails.

In some embodiments, the packet processing node 10 can be configured to perform both a normal lookup and an enhanced lookup. A different type of lookup may be performed depending on the hash bucket 44. For example, the enhanced lookup may be disabled if the signature patterns for two hash entries 46 are the same. As previously noted, the index table 48 may store a control bit to indicate the type of lookup to be performed. For example, the control bit can be set to a value of "1" to indicate that an enhanced lookup should be used, and to set a value of "0" to indicate that a normal lookup should be used.

Figure 5:
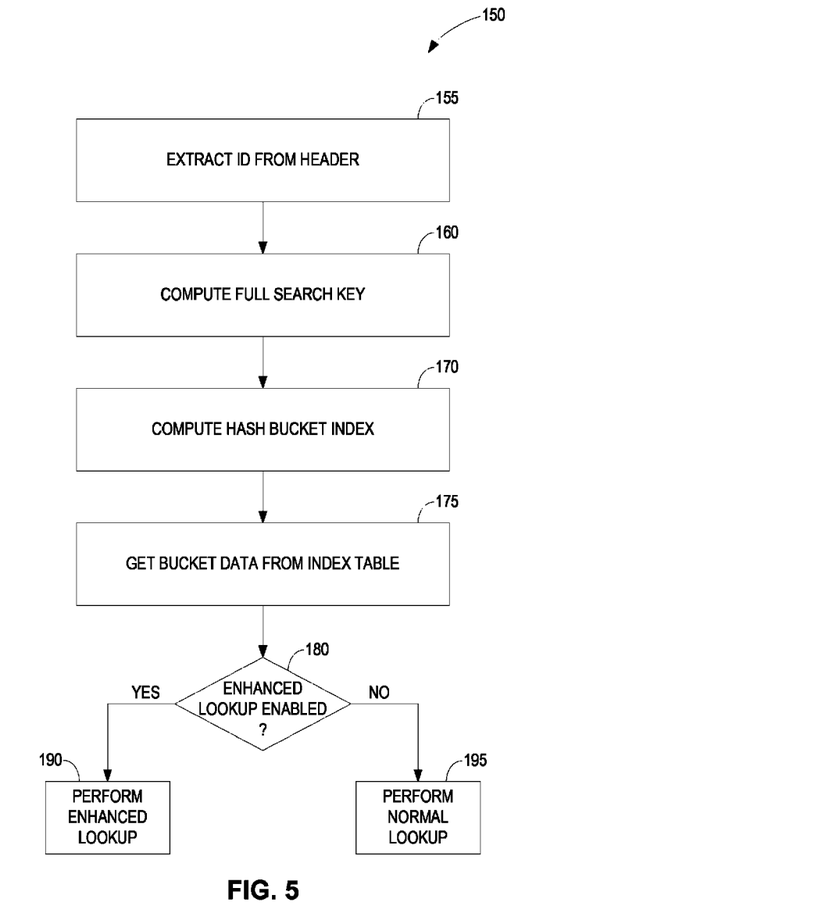
FIG. 5 illustrates an exemplary method for determining a type of lookup to perform according to an exemplary embodiment.

FIG. 5 illustrates an exemplary method 150 implemented by a packet processing node 10 for determining the type of lookup to perform. When a packet arrives at the packet processing node 10, the packet processing node 10 extracts the flow identifier from the packet header (block 155), computes the full search key (block 160), and determines the hash bucket 44 to be searched by computing a hash bucket index (block 170). Before continuing the data lookup, the packet processing node 10 determines what type of lookup to perform by checking the control bit from the index table (block 175). After the hash bucket 44 is identified, the packet processing node 10 accesses the index table 48 to determine if the enhanced lookup method is enabled (block 180). If so, the packet processing node 10 performs an enhanced lookup (block 190). If enhanced lookup is not enabled, the packet processing node 10 performs a normal lookup (block 195).

Figure 6:
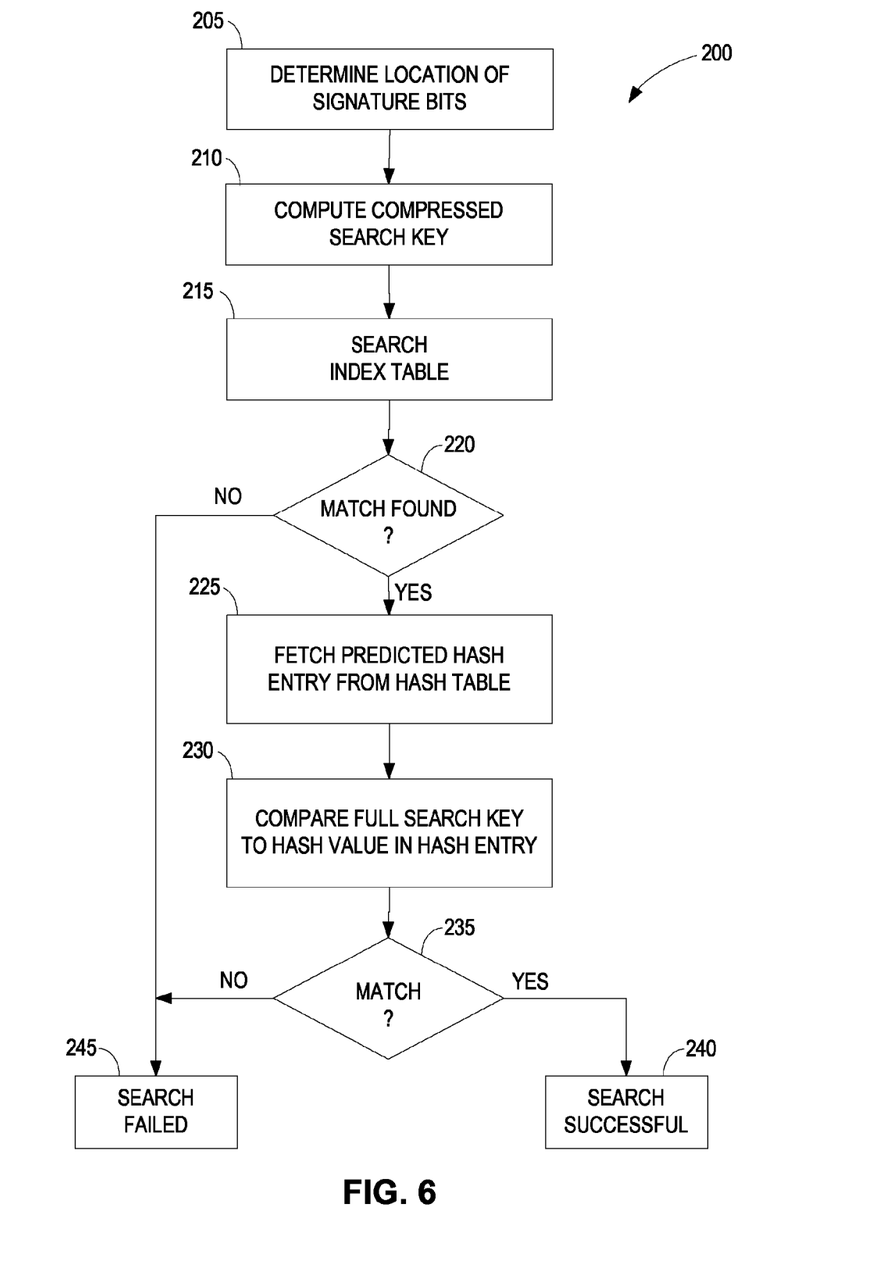
FIG. 6 illustrates an enhance lookup method according to an exemplary embodiment.

FIG. 6 illustrates a enhanced lookup method 200 performed at block 190 when the enhanced lookup is enabled. The packet processing node 10 determines the location of the signature bits (block 205). The bit locations for the signature bits are stored in the index table 48. The packet processing node 10 then extracts the signature bits from the search key and combines the signature bits to obtain a compressed search key (block 210). In one embodiment, the signature bits are combined to form the compressed search key. After the compressed search key is obtained, the packet processing node 10 searches the index table 48 for a matching signature pattern (block 215). A match indicates a hash entry 46 in the hash bucket 44 that is predicted to contain the desired data. At block 220, the packet processing node determines whether a match is found in the index table 48. If no match is found, the search fails (block 245). If a match is found in the index table 48, the packet processing node 10 retrieves the predicted hash entry 46 from the hash table 42 in external memory (block 225) and compares the full search key to the hash key stored in the hash entry 46 (block 230). At block 235, the packet processing node 10 determines whether the search key matches the stored hash key (block 235). If the search key matches the stored hash key, the search is successful (block 240). Otherwise the search fails (block 245).

Figure 7:
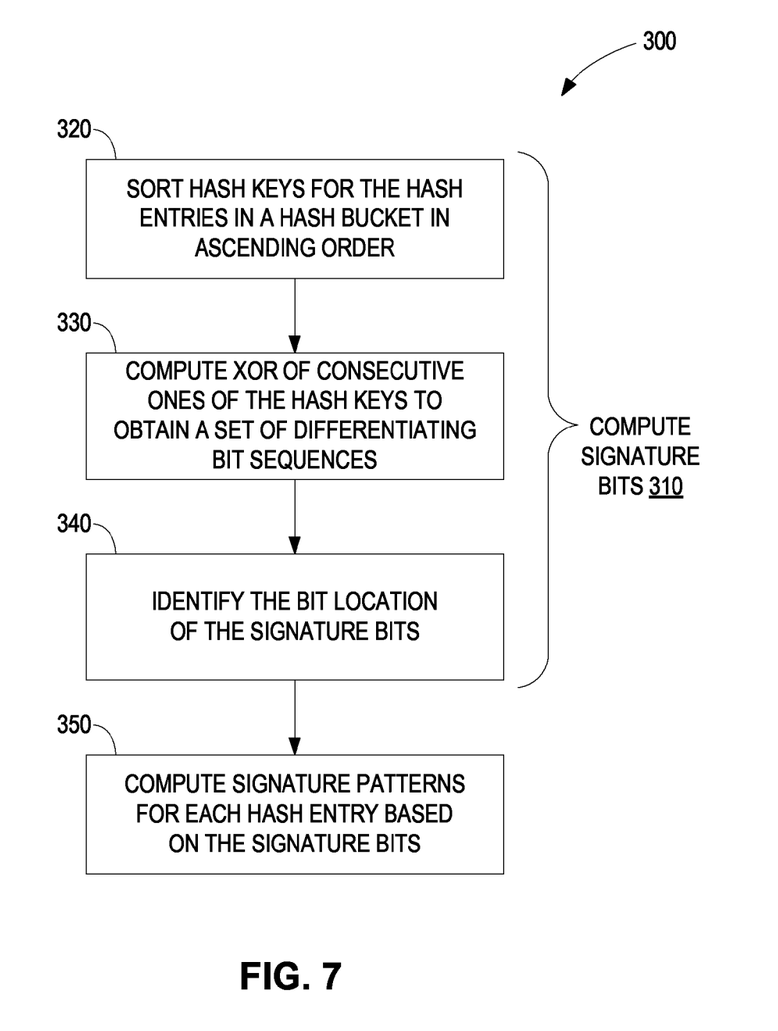
FIG. 7 illustrates an exemplary method for computing signature patterns according to an exemplary embodiment.

FIG. 7 illustrates an exemplary method 300 for computing the signature patterns for hash entries 46 in a hash bucket 44. The packet processing node 10 identifies the signature bits (block 310). To identify the signature bits, the packet processing node 10 sorts the hash keys for the hash entries 46 in a given hash bucket in ascending order (block 320). After sorting, the packet processing node 10 computes a set of differentiating bit sequences by computing the exclusive or (XOR) of consecutive ones of the hash keys (block 330). For example, the XOR of the first and second hash keys is computed to get a first differentiating bit sequence. The XOR of the second and third hash keys is then computed to get a second differentiating bit sequence. This process continues until the last final hash key is reached. It will be appreciated that the number of differentiating bit sequences will be one less than the number of hash keys. The packet processing node 10 then identifies the bit location in each differentiating bit sequence of the most significant bit (MSB) that is set to "1" (block 340). These bit locations are used to determine the signature bits in each hash key. Finally, the packet processing node 10 computes the signature patterns for each hash entry 46 by extracting and concatenating the signature bits in each hash key (block 350).

As an example, assume that the hash bucket 44 contains 4 hash entries 46 with the following 32-bit hash keys (HKs):

| Hash Key 1 | 00000100 00100101 00000000 00000000 |
|---|---|
| Hash Key 2 | 00100000 00101000 00000000 00000000 |
| Hash Key 3 | 00101000 00101100 00000000 00000000 |
| Hash Key 4 | 01001000 00101101 11001100 01010100 |

In this example, the hash keys are already sorted in ascending order. The packet processing node 10 computes the XOR of consecutive hash keys to obtain the following differentiating bit sequences:

| Sequence 1 | 00100100 00001101 00000000 00000000 |
| Sequence 2 | 00001000 00000100 00000000 00000000 |
| Sequence 3 | 01100000 00000001 11001100 01010100 |

For Sequence 1, the MSB set to "1" is bit 30. For Sequence 2, the MSB set to "1" is bit 28. And for Sequence 3, the MSB set to "1" is bit 31. Therefore, the signature bits are given by the triplet {30, 28, 31}. These bit locations are stored in the index table 48.

After determining the signature bits, the packet processing node 10 computes the signature pattern for each hash entry 46 by extracting and combining the signature bits in the hash keys. In this example, based on the triplet {30, 28, 31} corresponding to the 30th, 28th and 31st bits of each hash key (see the bold and underlined digits above) the signature patterns are as follows:

| Signature Pattern 1 | 000 |
| Signature Pattern 2 | 100 |
| Signature Pattern 3 | 110 |
| Signature Pattern 4 | 011 |

These signature patterns are stored in the index table 48.

Figure 8:
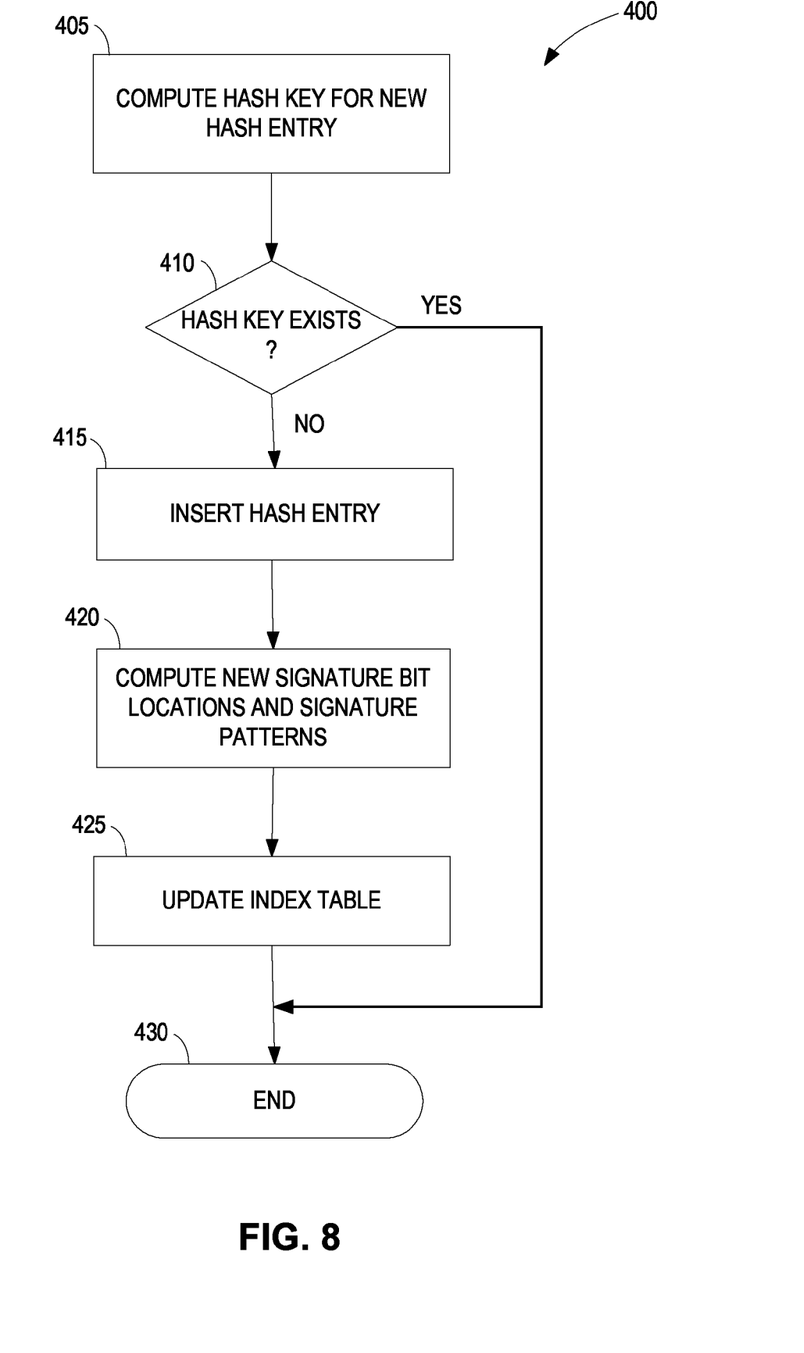
FIG. 8 illustrates an exemplary method of adding entries to a hash table according to an exemplary embodiment.

Those skilled in the art will appreciate that the bit locations and signature bits need to be recomputed whenever a new hash entry 46 is entered into a hash bucket 44. FIG. 8 shows an exemplary method 400 for adding hash entries 46 to a hash table 42 stored in external memory 40. It is assumed that the flow identifier and associated data are given. The packet processing node 10 computes a hash key for a new hash entry from the flow identifier using a hash function (block 405). The packet processing node 10 then determines whether the hash key already exists in the hash table 42 (block 410). The enhanced lookup procedures herein described may be used to search for the hash key. If the hash key exists, the process ends (block 430). If no matching entry 46 is found, the packet processing node creates a new hash entry 46 and inserts it into the hash table 42 (block 415). After inserting the hash entry, new signature bit locations and signature patterns are computed (block 420). The new signature bit locations and signature patterns are then stored in the index table (block 425) and the process ends (block 430).

Figure 9:
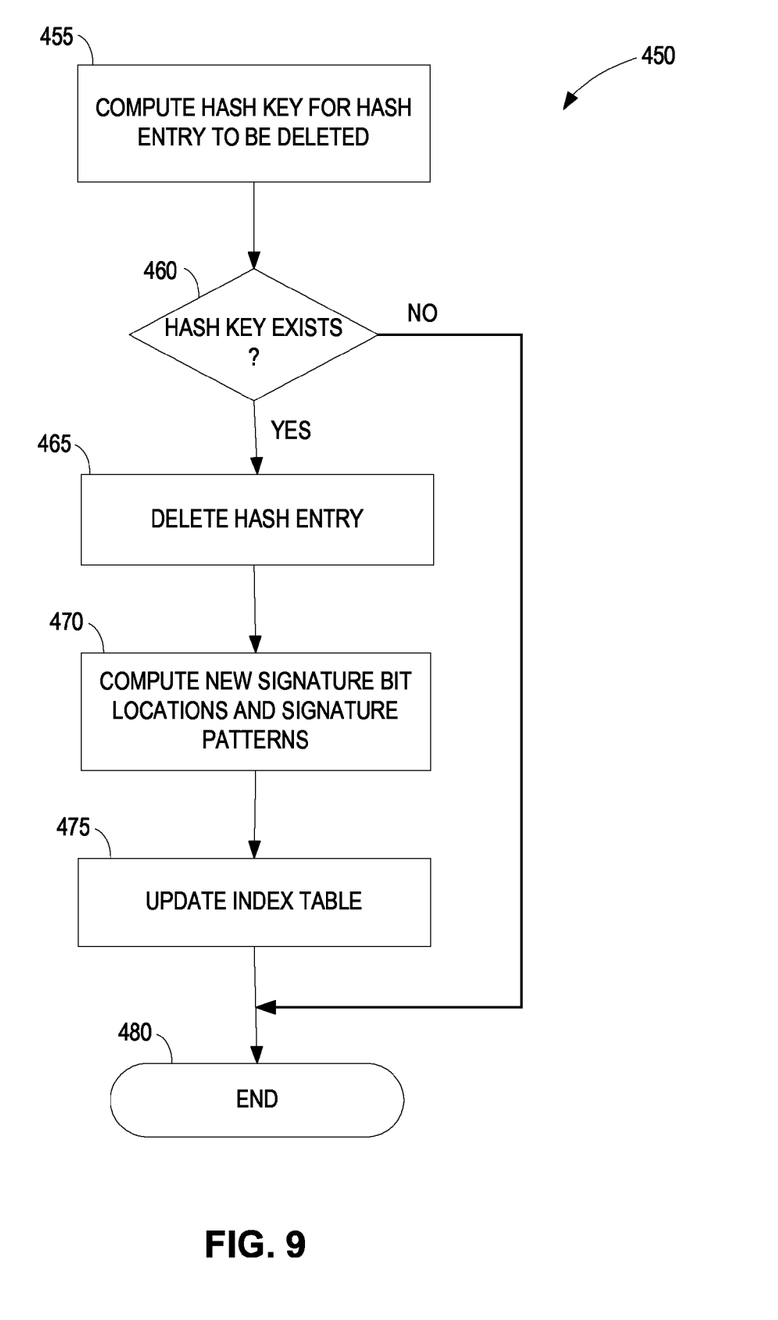
FIG. 9 illustrates an exemplary method of deleting entries from a hash table according to an exemplary embodiment.

FIG. 9 illustrates an exemplary method 450 for deleting a hash entry 46 from the hash table 42. It is assumed that a flow identifier is given. The packet processing node 10 computes a hash key for the hash entry 46 to be deleted (block 455). The packet processing node 10 searches the hash table 42 to determine whether a matching hash entry 46 exists (block 460). The enhanced lookup procedures herein described may be used to search for the hash key. If no matching hash entry 46 is found, the process ends (block 480). If a matching hash entry 46 is found, the matching hash entry 46 is deleted (block 465). The packet processing node 10 then computes new signature bit locations and signatures patterns based on the remaining hash entries 46 in the hash bucket 44 (block 470). Finally, the packet processing node 10 updates the index table (block 475) and the process ends (block 480).

Embodiments of the present invention allow faster hash lookups to be performed by reducing the number of times the external memory needs to be accessed to perform the lookup. The index table 48 used for performing enhanced hash lookup as herein described can be stored in internal registers, L1 cache, or L2 cache, which can be accessed in fewer processing cycles than the external memory. Even with additional processing instructions, the enhanced lookup can be performed in significantly less times than a conventional lookup.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method, implemented by a packet processing node in a packet-switched network, for performing a data lookup on a hash table, said method comprising:
   receiving a packet containing a flow identifier;
   generating a full search key from the flow identifier;
   determining a corresponding hash bucket in said hash table based on the full search key;
   creating a compressed search key from signature bits extracted from predetermined bit locations in the full search key;
   predicting a hash entry index for a target hash entry in the hash bucket by comparing the compressed search key to signature patterns that are mapped one-to-one to hash entries in the hash bucket, wherein the target hash entry comprises a hash key and associated data;
   for each hash bucket in the hash table, storing the bit locations for the signature bits and the signature patterns for the hash entries in the hash bucket in an index table; and
   performing said data lookup by comparing the full search key to the hash key in the target hash entry.

2. The method of claim 1 wherein generating a full search key from the flow identifier comprises hashing the flow identifier with a hash function.

3. The method of claim 1 wherein determining a corresponding hash bucket in a hash table based on the full search key comprises computing a hash bucket index from the full search key as a function of the hash bucket size.

4. The method of claim 3 further comprising determining bit locations of signature bits in the full search key using the hash bucket index to lookup the bit locations in the index table.

5. The method of claim 1 further comprising storing the index table in a local memory.

6. The method of claim 1 further comprising pre-computing the signature patterns for the hash entries and storing the pre-computed signature patterns in an index table.

7. The method of claim 6 wherein pre-computing the signature patterns comprises:
   computing the bit locations for the signature bits based on the hash entries in the hash bucket; and
   computing signature patterns for each hash entry based on the signature bits in the hash entry.

8. The method of claim 7 wherein computing the bit locations for the signature bits based on the hash entries in the hash bucket comprises:
   sorting the hash keys for the hash entries in a hash bucket in ascending order;
   computing the exclusive or (XOR) of consecutive ones of said hash keys to obtain a set of differentiating bit sequences;
   identifying the bit location of the most significant bit in each differentiating bit sequence.

9. The method of claim 1 further comprising:
   storing the bit locations of the signature bits and the signature patterns in a local memory; and
   storing the hash table in an external memory.

10. A packet processing node in a communication network, said packet processing node comprising:
   an interface circuit for receiving a packet containing a flow identifier;
   a control circuit for processing the packet, said control circuit configured to:
      generate a full search key from the flow identifier;
      determine a corresponding hash bucket in a hash table based on the full search key;
      create a compressed search key from signature bits extracted from predetermined bit locations in the full search key;
      predict a hash entry index for a target hash entry in the hash bucket by comparing the compressed search key to signature patterns that are mapped one-to-one to hash entries in the hash bucket, wherein the target hash entry comprises a hash key and associated data;
      for each hash bucket in the hash table, store the bit locations for the signature bits and the signature patterns for the hash entries in the hash bucket in an index table; and
      perform a data lookup by comparing the full search key to the hash key in the target hash entry.

11. The packet processing node of claim 10 wherein the control circuit is configured to hash the flow identifier with a hash function to generate the search key.

12. The packet processing node of claim 10 wherein the control circuit is configured to determine a corresponding hash bucket in a hash table based on the full search key by computing a hash bucket index from the full search key as a function of the hash bucket size.

13. The packet processing node of claim 12 wherein the control circuit is further configured to determine the bit locations of the signature bits in the full search key by using the hash bucket index to lookup the bit locations in the index table.

14. The packet processing node of claim 10 wherein the control circuit is configured to store the index table in a local memory.

15. The packet processing node of claim 10 wherein the control circuit is configured to pre-compute the signature patterns for the hash entries and store the pre-computed signature patterns in an index table.

16. The packet processing node of claim 15 wherein the control circuit is configured to pre-compute the signature patterns by:
   computing the bit locations for the signature bits based on the hash entries in the hash bucket; and
   computing signature patterns for each hash entry based on the signature bits in the hash entry.

17. The packet processing node of claim 16 wherein the control circuit is configured to compute the bit locations for the signature bits based on the hash entries in the hash bucket by:
   sorting the hash keys for the hash entries in a hash bucket in ascending order;
   computing the exclusive or (XOR) of consecutive ones of said hash keys to obtain a set of differentiating bit sequences;
   identifying the bit location of the most significant bit in each differentiating bit sequence.

18. The packet processing node of claim 10 wherein the control circuit is configured to:
   store the bit locations of the signature bits and the signature patterns in a local memory; and
   store the hash table in an external memory.

* * * * *